(12) United States Patent
Asaka et al.

(10) Patent No.: US 11,927,904 B2
(45) Date of Patent: Mar. 12, 2024

(54) ELECTROPHOTOGRAPHIC BELT HAVING A SUBSTRATE CONTAINING A POLYIMIDE RESIN AND CARBON NANOTUBES, ELECTROPHOTOGRAPHIC IMAGE FORMING APPARATUS, FIXING DEVICE, AND VARNISH

(71) Applicant: CANON KABUSHIKI KAISHA, Tokyo (JP)

(72) Inventors: Akeshi Asaka, Chiba (JP); Taiki Watanabe, Tokyo (JP); Yuma Kobayashi, Kanagawa (JP); Hidetaka Kawamura, Kanagawa (JP); Satoru Nishiuma, Kanagawa (JP); Akihiro Taya, Kanagawa (JP); Ryunosuke Kawahara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/836,325

(22) Filed: Jun. 9, 2022

(65) Prior Publication Data

US 2022/0404751 A1    Dec. 22, 2022

(30) Foreign Application Priority Data

Jun. 16, 2021 (JP) .................................. 2021-099881
Mar. 18, 2022 (JP) .................................. 2022-043956
May 16, 2022 (JP) .................................. 2022-080270

(51) Int. Cl.
*G03G 15/20* (2006.01)
*C08K 3/04* (2006.01)

(52) U.S. Cl.
CPC ......... *G03G 15/2057* (2013.01); *C08K 3/041* (2017.05); *G03G 15/2064* (2013.01);
(Continued)

(58) Field of Classification Search
CPC .................................................. G03G 15/2057
(Continued)

(56) References Cited

U.S. PATENT DOCUMENTS 7,457,577 B2   11/2008  Matsunaka et al.
9,335,690 B2    5/2016  Asaka et al.
(Continued)

FOREIGN PATENT DOCUMENTS

JP        8-80580 A    3/1996
JP    2004-123867 A    4/2004
(Continued)

OTHER PUBLICATIONS

Translation of WO2016140238 A1 (Year: 2016).*
Asaka et al., U.S. Appl. No. 17/828,301, filed May 31, 2022.

*Primary Examiner* — Quana Grainger
(74) *Attorney, Agent, or Firm* — Venable LLP (57) ABSTRACT

Provided is an electrophotographic belt of an endless shape including a substrate, wherein the substrate contains a polyimide resin and carbon nanotubes, wherein a content of the carbon nanotubes in the substrate is 15 vol % or less with respect to a total volume of the polyimide resin, wherein the substrate has a tensile strength of 200 MPa or more in each of a peripheral direction thereof and a direction perpendicular to the peripheral direction, and wherein the substrate has a thermal conductivity of 0.9 W/(m·K) or more in a thickness direction thereof.

12 Claims, 4 Drawing Sheets

(52) U.S. Cl.
CPC ............... *G03G 2215/2038* (2013.01); *G03G 2215/2051* (2013.01)

(58) Field of Classification Search
USPC ......................................................... 399/329
See application file for complete search history.

(56) References Cited

U.S. PATENT DOCUMENTS

| | | | |
|---|---|---|---|
| 9,348,282 B2 | 5/2016 | Tamura et al. | |
| 9,348,283 B2 | 5/2016 | Takada et al. | |
| 9,367,009 B2 | 6/2016 | Akiyama et al. | |
| 2006/0188300 A1 | 8/2006 | Matsunaka et al. | |
| 2010/0086787 A1* | 4/2010 | Qi ..................... | G03G 15/2057 |
| | | | 524/502 |
| 2016/0312068 A1* | 10/2016 | Kelly ...................... | C09D 7/70 |

FOREIGN PATENT DOCUMENTS

| | | | | |
|---|---|---|---|---|
| JP | 2006-330405 A | 12/2006 | | |
| JP | 2014-191023 A | 10/2014 | | |
| JP | 2016-065918 A | 4/2016 | | |
| WO | WO-2013080793 A1 * | 6/2013 | ............ | B28B 11/048 |
| WO | WO-2016140238 A1 * | 9/2016 | ......... | C08G 73/1067 |

\* cited by examiner

FIG. 4

ELECTROPHOTOGRAPHIC BELT HAVING A SUBSTRATE CONTAINING A POLYIMIDE RESIN AND CARBON NANOTUBES, ELECTROPHOTOGRAPHIC IMAGE FORMING APPARATUS, FIXING DEVICE, AND VARNISH

BACKGROUND

Technical Field

The present disclosure relates to an electrophotographic belt, an electrophotographic image forming apparatus, a fixing device, and a varnish.

Description of the Related Art

A polyimide resin has excellent mechanical strength, excellent heat resistance, an excellent insulating property, and the like, and hence has been suitably used in, for example, an intermediate transfer belt for transferring toner in an electrophotographic image forming apparatus onto a recording material such as paper, or a fixing belt for heating and fixing a toner image transferred from the intermediate transfer belt onto the recording material.

For example, a fixing device having such a configuration as described below is available as a fixing device of a belt (film) heating system. That is, a fixing device including a fixing belt of an endless shape and a pressurizing member arranged to face the fixing belt, the pressurizing member forming a fixing nip portion together with the fixing belt, is available. In such fixing device, the fixing belt exhibits the following function. The fixing belt transfers heat, which is supplied from a heater arranged inside the fixing belt to the fixing belt, to toner on a recording material in the fixing nip portion to melt the toner, to thereby fix the toner to the recording material.

As described above, the fixing belt is always heated in the step of forming an electrophotographic image, and is bent every time the belt passes through the fixing nip portion. Accordingly, the substrate of the fixing belt is required to have high mechanical strength (e.g., such high bending resistance that no crack occurs even when the belt is repeatedly bent) and sufficient heat resistance. In addition, the polyimide resin is available as a resin that provides a substrate having both of sufficient heat resistance and high mechanical strength. However, the thermal conductivity of a resin is lower than those of a metal and a ceramic by several orders of magnitude. Accordingly, it can be said that a fixing belt including a substrate made of the polyimide resin is disadvantageous as compared to a fixing belt including a substrate made of the metal or the ceramic in terms of efficient transfer of the heat from the heater to the toner. That is, in the fixing belt including the substrate made of the polyimide resin, an improvement in thermal conductivity in its thickness direction is important for satisfying requirements, such as: a further increase in print speed; a further reduction in power consumption required for heat supply to the heater (energy savings); and further downsizing of the fixing device.

In Japanese Patent Application Laid-Open No. H08-80580, there is a disclosure that an inorganic filler excellent in thermal conductivity is incorporated for achieving, for example, a reduction in power consumption, an increase in fixing speed, and a reduction in fixing temperature through an improvement in thermal conductivity of a fixing belt using a polyimide resin as its substrate.

However, to obtain a substrate having a high thermal conductivity, the content of the filler in the substrate needs to be increased. In addition, in the case where the content of the filler in the substrate is increased, even when a polyimide resin excellent in strength is used as a binder resin, the mechanical strength of the substrate may reduce. That is, as described in each of Examples of Japanese Patent Application Laid-Open No. 2004-123867, when the content of carbon nanotubes in a polyimide substrate is increased, the mechanical strength of the polyimide substrate may reduce.

SUMMARY

At least one aspect of the present disclosure is directed to providing an electrophotographic belt of an endless shape, which has a high thermal conductivity in a thickness direction thereof, and has a high tensile strength in each of a peripheral direction thereof and a direction perpendicular to the peripheral direction. In addition, one aspect of the present disclosure is directed to providing a fixing device and an electrophotographic image forming apparatus that are each capable of forming a high-quality electrophotographic image. Further, one aspect of the present disclosure is directed to providing a varnish that can provide a polyimide film of an endless shape, the film having a high thermal conductivity in a thickness direction thereof, and showing a high tensile strength in each of a peripheral direction thereof and a direction perpendicular to the peripheral direction.

According to one aspect of the present disclosure, there is provided an electrophotographic belt having endless shape and comprising a substrate, the substrate containing a polyimide resin and carbon nanotubes, a content of the carbon nanotubes in the substrate is 15 vol % or less with respect to a total volume of the polyimide resin, the substrate having a tensile strength of 200 MPa or more in each of a peripheral direction thereof and a direction perpendicular to the peripheral direction, and the substrate having a thermal conductivity of 0.9 W/(m·K) or more in a thickness direction thereof.

According to another aspect of the present disclosure, there is provided a fixing device including: a fixing belt; and a rotating body for pressurization arranged to face the fixing belt, wherein the fixing belt is the above-mentioned electrophotographic belt. According to another aspect of the present disclosure, there is provided an electrophotographic image forming apparatus including the above-mentioned fixing device. According to still another aspect of the present disclosure, there is provided a varnish including: a polyamic acid; a solvent for the polyamic acid; carbon nanotubes; and a compound having a surface tension which differs from that of the solvent by 4 mN/m or more and 17 mN/m or less.

Further features of the present disclosure will become apparent from the following description of exemplary embodiments with reference to the attached drawings.

DESCRIPTION OF THE EMBODIMENTS

Embodiments of the present disclosure are examples for carrying out the present disclosure, and the present disclosure is not limited to these embodiments.

An electrophotographic belt according to one aspect of the present disclosure includes a substrate having an endless shape, the substrate containing a polyimide resin. The substrate has a tensile strength of preferably 200 MPa or more, more preferably 230 MPa or more in each of its peripheral direction and the direction perpendicular to the peripheral direction. When the substrate has such tensile strength, its durability against bending at the time of its use as an electrophotographic belt becomes sufficient.

In addition, the substrate contains carbon nanotubes (hereinafter sometimes referred to as "CNTs"), and the ratio of the CNTs to the total volume of the polyimide resin is 15 vol % or less. When the amount of the CNTs in the substrate is suppressed to 15 vol % or less, the above-mentioned tensile strength can be imparted to the substrate containing the polyimide resin.

Meanwhile, the thermal conductivity of the substrate in its thickness direction is preferably 0.9 W/(m·K) or more, more preferably 1.0 W/(m·K) or more. When the thermal conductivity of the substrate in the thickness direction is 0.9 W/(m·K) or more, heat from a heater can be efficiently transferred to unfixed toner that is a heating object at the time of the use of the substrate as an electrophotographic belt, in particular, a fixing belt.

Herein, the content of the CNTs in the substrate according to one aspect of the present disclosure is suppressed to 15 vol % or less with respect to the polyimide resin from the viewpoint of setting the tensile strength in each of the peripheral direction and the direction perpendicular to the peripheral direction to 200 MPa or more. In the case of a CNT content of this level, it is typically difficult to set the thermal conductivity of the substrate in the thickness direction within the above-mentioned ranges. However, the inventors have made an investigation, and as a result, have found that when a ratio I(002)/I(100) between the intensities of the X-ray diffraction peaks of a polyimide substrate blended with CNTs detected by a reflection X-ray diffraction method is set to 35 or less, such a substrate as described below is obtained: while the content ratio of the CNTs with respect to the polyimide resin of the substrate is 15 vol % or less, the thermal conductivity of the substrate in its thickness direction is 0.9 W/(m·K) or more. Herein, I(002) represents the intensity of a diffraction peak derived from the (002) crystal plane of each of the CNTs, and I(100) represents the intensity of a diffraction peak derived from the (100) crystal plane of each of the CNTs.

The inventors have assumed the reason why when the surface of the substrate is subjected to measurement by the reflection X-ray diffraction method, and the intensity of the diffraction peak derived from the (100) crystal plane of each of the carbon nanotubes is represented by I(100) and the intensity of the diffraction peak derived from the (002) crystal plane of each of the carbon nanotubes is represented by I(002), the thermal conductivity of the substrate in the thickness direction can be set to 0.9 W/(m·K) or more by setting the ratio I(002)/I(100) to 35 or less to be as described below.

In the polyimide substrate containing the CNTs, the CNTs are liable to be aligned in the in-plane direction of the substrate. The CNTs each have such a property as to easily transfer heat in its own longitudinal direction, and hence the substrate having the CNTs aligned in the in-plane direction has a high thermal conductivity in the in-plane direction and a low thermal conductivity in its thickness direction. In addition, the X-ray diffraction peak intensity I(002) is proportional to the amount of the CNTs aligned in the in-plane direction. Accordingly, in the substrate having a strong X-ray diffraction peak intensity I(002), many of the CNTs are aligned in the in-plane direction. Accordingly, the thermal conductivity of the substrate in the thickness direction reduces. In contrast, as the orientation of the CNTs is directed toward the thickness direction of the substrate to a larger extent, the X-ray diffraction peak intensity I(002) weakens. Accordingly, as the X-ray diffraction peak intensity I(002) weakens, the thermal conductivity of the substrate in the thickness direction increases.

Incidentally, the I(002) may be affected by the blending amount of the CNTs and the thickness of the substrate. Meanwhile, the I(100) is derived from a carbon six-membered ring structure for forming each of the CNTs, and is hence hardly affected by the alignment direction of the CNTs in the substrate. Accordingly, the intensity ratio I(002)/I(100) of the I(002) with respect to the I(100) can be used as an indicator of the aligned state of the CNTs in the substrate from which the influences of the blending amount of the CNTs and the thickness of the substrate have been eliminated.

It can be said from the foregoing that the polyimide substrate having an X-ray diffraction peak intensity ratio I(002)/I(100) of 35 or less is brought into a state in which the CNTs that are liable to be aligned in the in-plane direction of the substrate are directed toward the thickness direction. Accordingly, the polyimide substrate having an X-ray diffraction peak intensity ratio I(002)/I(100) of 35 or less has a higher thermal conductivity in the thickness direction than a polyimide substrate having an X-ray diffraction peak intensity ratio I(002)/I(100) of more than 35 does.

Herein, the ratio (g/d) of the intensity "g" of a G band to the intensity "d" of a D band in the Raman spectrum of the CNTs in the present disclosure is preferably 10 or more, more preferably 15 or more. As described in detail later, the CNTs having a small g/d ratio contain many defects in their graphite structures each including $sp^2$ carbon, and hence lattice vibration is inhibited to reduce the thermal conductivities of the CNTs themselves. Accordingly, the thermal conductivity of the substrate cannot be set within the above-mentioned ranges irrespective of the aligned state of the CNTs in the substrate, that is, the value of the X-ray diffraction peak intensity ratio I(002)/I(100).

Next, a method of obtaining a state in which the CNTs are directed toward the thickness direction of the polyimide substrate is described. Specifically, a varnish having dispersed therein the CNTs (also referred to as "polyimide precursor solution") is blended with a small amount of a specific organic compound in advance. When the film of the varnish is subjected to cyclodehydration (imidized) by heating to form a film of the polyimide resin, the CNTs that are liable to be aligned in the in-plane direction of the film are solidified under a state of being effectively disturbed in the thickness direction thereof by the organic compound. Accordingly, even when the blending ratio of the CNTs is small, a high thermal conductivity can be imparted in the thickness direction. More specifically, the varnish having dispersed therein the CNTs is blended with a small amount of an organic compound, such as 2,4-dimethyl-3-pentanone, 2-methylsulfonylethanol, or o-chlorophenol, in advance. Although the mechanism via which the high thermal conductivity can be imparted is unclear, the mechanism is conceived to be as described below. In a process including heating the film of the varnish to evaporate its solvent, the evaporation of such organic compound causes a microscopic surface tension difference at the gas-liquid interface of the solution to cause convection. The convection may align the CNTs, which have been aligned in the in-plane direction of the film, in the thickness direction.

That is, the substrate containing the polyimide resin in the present disclosure may be obtained by imidizing the film of a varnish including: a polyamic acid; a solvent for the polyamic acid; the CNTs; and a compound having a surface tension which differs from that of the solvent by 4 mN/m or more and 17 mN/m or less.

The thickness of the substrate containing the polyimide resin in the present disclosure is preferably 40 μm or more and 150 μm or less, more preferably 70 μm or more and 100 μm or less. When the thickness is 40 μm or more, the in-plane alignment of the CNTs can be suppressed, and hence the thermal conductivity of the substrate in its thickness direction is easily increased. In addition, when the thickness is 150 μm or less, the substrate may have sufficient durability against bending.

[Polyimide Resin]

The polyimide resin to be used as the substrate of the electrophotographic belt according to this embodiment may be produced by, for example, causing equimolar amounts of an aromatic tetracarboxylic dianhydride and an aromatic diamine to react with each other in an aprotic polar organic solvent to produce a polyamic acid serving as a precursor resin (hereinafter also referred to as "polyimide precursor"), processing the precursor into a desired shape at the stage of the soluble precursor solution, and then heating the processed product to subject the product to cyclodehydration (imidization).

Examples of the aromatic tetracarboxylic dianhydride include, but not limited to, pyromellitic dianhydride, 3,3',4,4'-biphenyltetracarboxylic dianhydride, 2,3',3,4'-biphenyltetracarboxylic dianhydride, 2,2'-bis(3,4-dicarboxyphenyl)propane dianhydride, and bis(3,4-dicarboxyphenyl) ether dianhydride. Those aromatic tetracarboxylic dianhydrides exemplified above may be used alone or in combination thereof.

Examples of the aromatic diamine include, but not limited to, p-phenylenediamine, m-phenylenediamine, 4,4'-diaminodiphenyl ether, 4,4'-diaminodiphenylmethane, and 3,3'-diaminodiphenylmethane. Those aromatic diamines exemplified above may be used alone or in combination thereof.

A polyimide resin obtained by using a polyimide precursor produced from 3,3',4,4'-biphenyltetracarboxylic dianhydride and p-phenylenediamine out of those compounds is preferred because the resin may have a particularly high tensile strength and particularly high toughness.

The polar organic solvent is, for example, a solvent having a functional group having a dipole that is substantially free from reacting with the aromatic tetracarboxylic dianhydride or the aromatic diamine. Examples thereof include, but not limited to, N,N-dimethylformamide (DMF), N,N-dimethylacetamide (DMAc), dimethyl sulfoxide (DMSO), N-methyl-2-pyrrolidone (NMP), and γ-butyrolactone (γ-BL). Those organic solvents may be used alone or in combination thereof. Of those, at least one kind selected from the group consisting of: NMP; and DMF is preferred.

[Carbon Nanotubes]

Carbon nanotubes are most preferred as thermally conductive particles (filler) for improving the thermal conductivity of the polyimide resin. The carbon nanotubes are each nanosized cylindrical carbon having a structure obtained by rounding a graphene sheet in a cylindrical shape. Graphene has a structure in which benzene rings are spread without any gap by an $sp^2$ bond, and the carbon nanotubes each have an endless characteristic structure called a cylindrical structure. Accordingly, the scattering of lattice vibration (phonon) that is a carrier of heat conduction is suppressed, and hence the carbon nanotubes each show extremely high thermal conductivity. Accordingly, even when the carbon nanotubes are added in a small amount as compared to a highly thermally conductive inorganic filler, the thermal conductivity of the resin can be improved.

Although a method of producing the carbon nanotubes (hereinafter also referred to as "CNTs") is not limited, out of, for example, an arc discharge method, a laser ablation method, and a chemical vapor deposition method, the chemical vapor deposition method may be most preferably used because of, for example, the following reasons: a large amount of the CNTs can be synthesized in high yield; and the amount of impurities is small.

CNTs to be more suitably used are multi-wall carbon nanotubes produced by the chemical vapor deposition method (CVD method) because of their excellent thermal conductivity. This is because the CNTs have a small number of defects on their surfaces. The surfaces of the CNTs each have a sheet structure (graphite structure) in which all benzene rings are bonded so as to be adjacent to each other, and each theoretically include $sp^2$ carbon. However, the surfaces may each partially have $sp^3$ carbon in addition to the $sp^2$ carbon depending on a production method for the CNTs. The $sp^3$ carbon has bonded thereto an atom, such as hydrogen, oxygen, or nitrogen, and the portion having bonded thereto the atom is called a defect. Heat is conducted through the graphite structure on each of the CNTs, and hence when the number of the defects is large, heat transfer is inhibited.

As a method of distinguishing CNTs having a small number of defects and CNTs having a large number of defects, an approach including relatively comparing the g/d ratios of their Raman spectra is available. The symbol "g" of the g/d ratio represents the peak intensity of a G band (near 1,590 $cm^{-1}$) in each of the Raman spectra, and represents a peak intensity derived from the graphite structure. In addition, the symbol "d" represents the peak intensity of a D band (near 1,350 $cm^{-1}$) therein, and represents a peak intensity derived from the defects. When the g/d ratio is large (the intensity of the G band with respect to the intensity of the D band is large), the CNTs can be determined to be CNTs having a small number of defects. Preferred CNTs of the present disclosure have a g/d ratio of 10 or more, and more preferred CNTs have a g/d ratio of 15 or more.

The average fiber diameter of the CNTs is preferably 10 nm or more and 200 nm or less. When the average fiber diameter is 10 nm or more, an excessive increase in specific surface area of the CNTs is suppressed, and hence the CNTs can be prevented from aggregating. As a result, the CNTs can be more satisfactorily dispersed in the polyimide resin. As a result, a heat conduction path can be more reliably formed in the thickness direction of the substrate by the CNTs. In addition, the aggregate of the CNTs can be suppressed from being mixed into the substrate, and hence the breakage of the substrate due to the concentration of a stress on the aggregate can be prevented. Meanwhile, when the average fiber diameter is 200 nm or less, even in the case where the content of the CNTs in the substrate is set to 15 vol % or less, a sufficient number of the CNTs can be caused to exist in the substrate. As a result, the heat conduction path can be more reliably formed in the thickness direction of the substrate by the CNTs.

In addition, the fiber length of each of the CNTs is preferably 30 μm or less. When the CNTs each having a fiber length of 30 μm or less are used, even in the case where the thickness of the substrate is as small as, for example, 100 μm, the surface property of the substrate can be prevented from being affected.

[Organic Compound]

In this embodiment, in view of the fact that in the film of the polyimide resin (belt substrate), the CNTs are liable to be aligned in the in-plane direction of the film, a specific organic compound is added to the polyimide precursor solution for suppressing the alignment so that the CNTs may be easily directed toward the thickness direction of the film. More specifically, an organic compound having a surface tension which differs from that of the solvent of the solution by 4 mN/m or more and 17 mN/m or less is used. A case in which the compound is blended at a ratio of 0.1 mass % or more and 6.0 mass % or less with respect to the total mass of the varnish is preferred. Examples of the compound include, but not limited to, ethylene glycol, 3-methoxy-3-methyl-butanol, diisobutylamine, 3'-nitroacetophenone, 5-(2-hydroxyethyl)-4-methylthiazole, furfuryl alcohol, o-chlorophenol, 2-hydroxyethyl methyl sulfone, and 2,4-dimethyl-3-pentanone. Those compounds may be used alone or in combination thereof.

The organic compound needs to remain in the film of the polyimide precursor solution to cause convection during the baking of the film, but after the baking, the following is preferred: the compound evaporates, and hence does not remain in the film and does not reduce the strength of the film. According to an investigation made by the inventors, the boiling point of the organic compound is preferably 120° C. or more and 350° C. or less, and the boiling point is particularly preferably 140° C. or more and 300° C. or less. The organic compound having a boiling point within the temperature ranges can be prevented from evaporating from the film of the polyimide precursor solution at the initial stage of the baking of the film. As a result, the in-plane direction alignment of the CNTs in the film can be more reliably disturbed. In addition, when the organic compound having a boiling point of 350° C. or less is used, the organic compound can be prevented from excessively remaining in the polyimide film after the baking.

[Fixing Belt]

Figure 1:
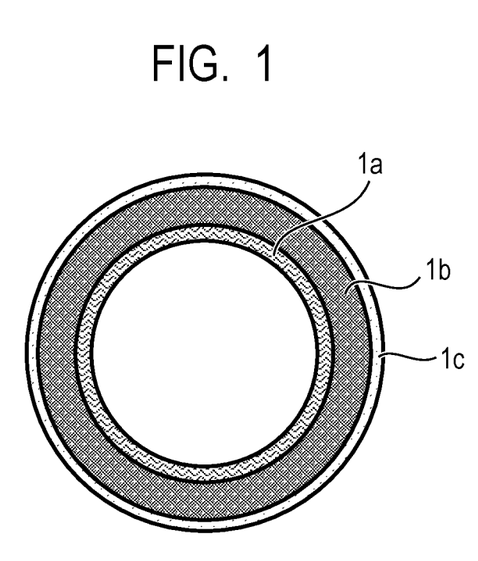
FIG. 1 is a schematic sectional view of a fixing belt used in Examples of the present disclosure.

FIG. 1 is a schematic sectional view of a fixing belt according to this embodiment. A fixing belt 1 includes: a substrate 1a formed of the polyimide resin described above; and a release layer 1c formed of a fluorine resin on at least the outer peripheral surface side of the substrate 1a.

The release layer 1c includes a fluorine resin, and serves to prevent the adhesion of toner by virtue of low surface energy of the fluorine resin. For example, a product obtained by molding a resin, such as a tetrafluoroethylene-perfluoro (alkyl vinyl ether) copolymer (PFA), polytetrafluoroethylene (PTFE), or a tetrafluoroethylene-hexafluoropropylene copolymer (FEP), into a tube shape is used as the fluorine resin layer serving as the release layer. Of the materials exemplified and listed above, a PFA is preferred from the viewpoints of moldability and toner releasability. The thickness of the fluorine resin layer is preferably 50 μm or less. This is because when the release layer is laminated, the elasticity of a silicone rubber elastic layer serving as a lower layer is maintained, and hence the surface hardness of the fixing belt can be suppressed from becoming excessively high. The inner surface of the fluorine resin tube may be improved in adhesive property by being subjected to, for example, sodium treatment, excimer laser treatment, or ammonia treatment in advance. In this embodiment, a PFA tube having a thickness of 20 μm, which had been obtained by extrusion molding, was used. The inner surface of the tube is subjected to ammonia treatment for improving its wettability with an adhesive to be described later.

Further, an elastic layer 1b formed of a silicone rubber may be additionally arranged as an intermediate layer between the substrate 1a and the release layer 1c. The silicone rubber elastic layer 1b functions as an elastic layer for imparting elasticity to a fixing member for applying a uniform pressure to a toner image and the irregularities of a sheet of paper at the time of its fixation. To express such function, an addition reaction-crosslinkable liquid silicone rubber is preferably used as a material for the silicone rubber elastic layer 1b because of, for example, the following reasons: the rubber is easy to process; the rubber can be processed with high dimensional accuracy; and the rubber does not produce any reaction by-product at the time of its heat curing. In addition, another reason thereof is that the elasticity of the rubber can be adjusted by adjusting the crosslinking degree thereof in accordance with the kind and addition amount of a filler to be described later.

The addition reaction-crosslinkable liquid silicone rubber generally contains: organopolysiloxane having an unsaturated aliphatic group; organopolysiloxane having active hydrogen bonded to silicon; and a platinum compound serving as a crosslinking catalyst.

The organopolysiloxane having active hydrogen bonded to silicon is caused to react with an alkenyl group of the organopolysiloxane component having an unsaturated aliphatic group by the catalytic action of the platinum compound to form a crosslinked structure.

The silicone rubber elastic layer 1b may contain a filler for, for example, improving the thermal conductivity of the fixing belt, reinforcing the belt, and improving the heat resistance thereof.

In particular, the filler is preferably highly thermally conductive for the purpose of improving the thermal conductivity. A specific example thereof may be inorganic matter, in particular, a metal or a metal compound.

Specific examples of the highly thermally conductive filler include silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), and nickel (Ni).

Those materials may be used alone or as a mixture thereof. The average particle diameter of the highly thermally conductive filler is preferably 1 μm or more and 50 μm or less from the viewpoints of handling and dispersibility.

In addition, as a shape thereof, there are used, for example, a spherical shape, a pulverized shape, a plate shape, and a whisker shape. Of those, a highly thermally conductive filler of a spherical shape is preferred from the viewpoint of dispersibility.

The thickness of the silicone rubber elastic layer 1b falls within the range of preferably from 100 μm or more to 500 μm or less, particularly preferably from 200 μm or more to 400 μm or less in terms of contribution to the surface hardness of the fixing belt and the efficiency of heat conduction to unfixed toner at the time of its fixation.

In this embodiment, alumina was used as the highly thermally conductive filler, and the thermal conductivity and thickness of the elastic layer 1b were set to 1.0 W/(m·K) and 300 μm, respectively.

[Electrophotographic Fixing Device]

An example of an electrophotographic fixing device using the fixing belt is described below.

Figure 2:
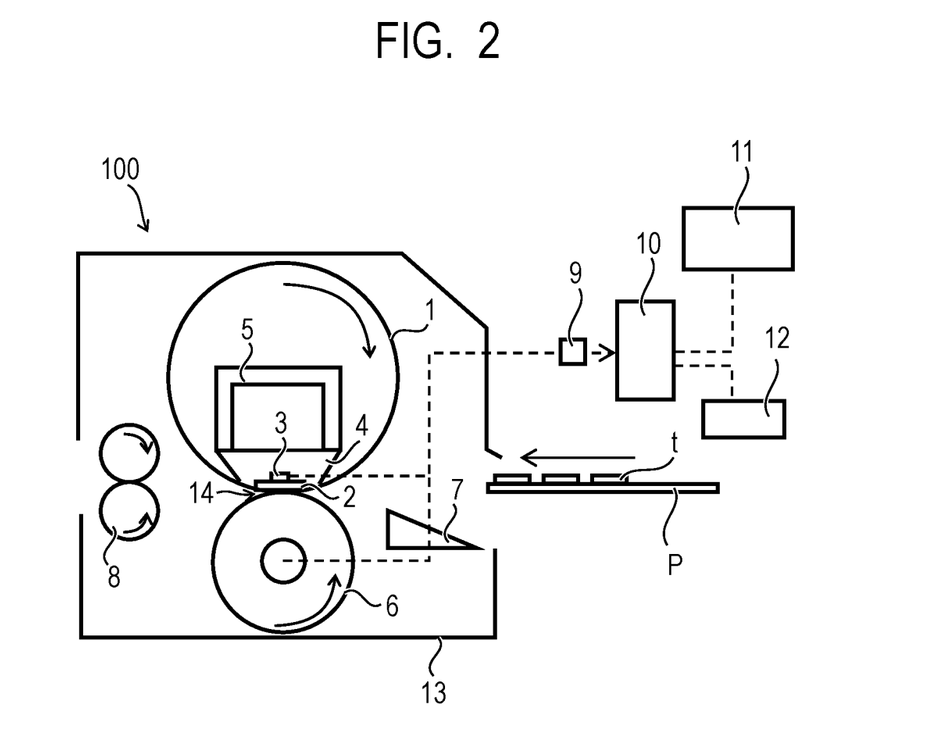
FIG. 2 is a schematic sectional view of a fixing device used in Examples of the present disclosure.

FIG. 2 is a schematic sectional view of a fixing device 100 according to one aspect of the present disclosure. The fixing device 100 includes: the fixing belt 1 of an endless shape; and a pressurizing roller (rotating body for pressurization) 6 arranged to face the fixing belt, the roller forming a fixing nip portion 14 together with the fixing belt. In addition, the electrophotographic belt according to one aspect of the present disclosure is mounted as the fixing belt 1.

A fixing heater 2 serves as a heating unit, and a film guide-cum-heater holder 4 has heat resistance. The fixing heater 2 is fixed to the lower surface of the film guide-cum-heater holder 4 along the longitudinal direction of the film guide-cum-heater holder 4, and has such a configuration that its heating surface is slidable with respect to the fixing belt 1. In addition, the fixing belt 1 is fit onto the film guide-cum-heater holder 4 with some degree of freedom. The film guide-cum-heater holder 4 is formed of a liquid crystal polymer resin having high heat resistance, and serves to hold the fixing heater 2 and to turn the fixing belt 1 into a shape for allowing the belt to be separated from a recording material P. The pressurizing roller 6 has a multilayer structure in which a silicone rubber layer having a thickness of about 3 mm and a PFA resin tube having a thickness of about 40 μm are sequentially laminated on a stainless steel-made cored bar. Both the end portions of the cored bar of the pressurizing roller 6 are rotatably bearing-held between the back-side and front-side side plates (not shown) of a device frame 13. A fixing unit including the fixing heater 2, the film guide-cum-heater holder 4, a fixing belt stay 5, and the fixing belt 1 is arranged on the upper side of the pressurizing roller 6. The fixing unit is arranged parallel to the pressurizing roller 6 with its fixing heater 2 side directed downward. One-end sides of both the end portions of the fixing belt stay 5 are energized toward the pressurizing roller 6 by a pressurizing mechanism (not shown) with a force of 156.8 N (16 kgf) each, that is, a total force of 313.6 N (32 kgf). As a result, the lower surface (heating surface) of the fixing heater 2 is brought into pressure contact against the elastic layer of the pressurizing roller 6 through the fixing belt 1 with a predetermined pressing force, and hence the fixing nip portion 14 having a predetermined width required for the fixation of a toner image "t" on the recording material P guided and introduced by a guiding member 7 is formed. The recording material P exiting the fixing nip portion 14 is separated from the fixing belt 1 in curvature and sent out of the fixing device 100 by a pair of fixing paper discharge rollers 8. A thermistor 3 serves as a temperature-detecting unit. The thermistor 3 (heater temperature sensor) is arranged on the rear surface (surface opposite to the heating surface) of the fixing heater 2, which is a heat source, to bear a function of detecting the temperature of the fixing heater 2. The pressurizing roller 6 is rotationally driven in an arrow direction at a predetermined peripheral speed. The fixing belt 1 in such a relationship as to be brought into pressure contact therewith rotates at a predetermined speed following the pressurizing roller 6. At this time, the following state is established: the inner surface of the fixing belt 1 rotates around the circumference of the film guide-cum-heater holder 4 in the arrow direction following the fixing heater 2 while being brought into close contact with the lower surface of the fixing heater 2 to slide with respect thereto.

A semisolid lubricant to be described later is applied to the inner surface of the fixing belt 1 to secure slidability between the film guide-cum-heater holder 4 and the inner surface of the fixing belt 1. The thermistor 3 is arranged so as to be brought into contact with the rear surface of the fixing heater 2, and is connected to a control circuit portion (CPU) 10 serving as a controlling unit through an A/D converter 9. The control circuit portion (CPU) 10 samples respective outputs from the thermistor 3 at a predetermined cycle, and is configured to reflect temperature information thus obtained in temperature control. In other words, the control circuit portion (CPU) 10 serves to determine the temperature control contents of the fixing heater 2 based on the outputs of the thermistor 3 to control electrification to the fixing heater 2 by a heater-driving circuit portion 11, which is a power-supplying portion, so that the temperature of the fixing heater 2 may reach a target temperature (preset temperature). In addition, the control circuit portion (CPU) 10 also serves to control a sequence for estimating the lifetime of the fixing belt to be described later, and is connected to the driving motor 12 of the pressurizing roller 6 through the A/D converter 9. The fixing heater includes: an alumina substrate; and a resistance heating element obtained by applying an electroconductive paste containing a silver-palladium alloy thereonto in a uniform film shape having a thickness of about 10 μm by a screen printing method. The heater is a ceramic heater in which the top of the resistance heating element is further coated with pressure-resistant glass.

[Electrophotographic Image Forming Apparatus]

An example of an electrophotographic image forming apparatus using the above-mentioned fixing belt is described below.

Figure 3:
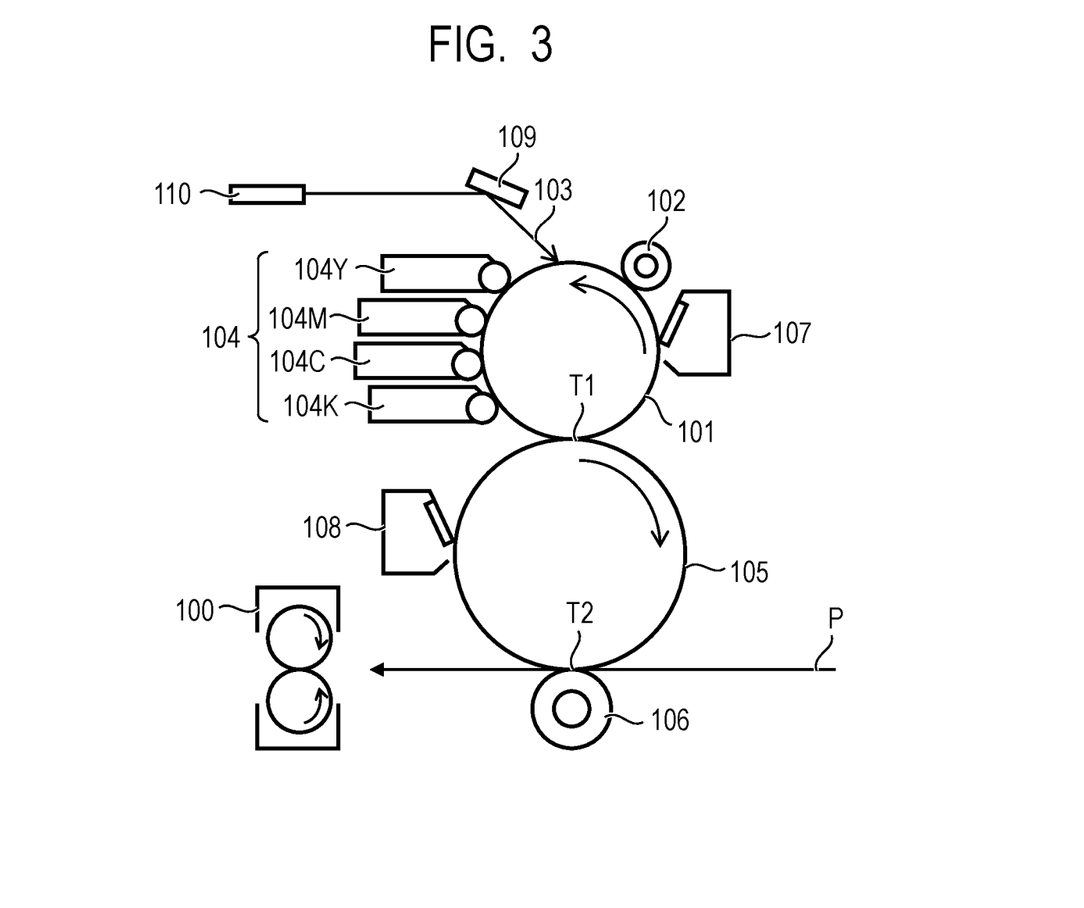
FIG. 3 is a schematic sectional view of an electrophotographic image forming apparatus used in Examples of the present disclosure.

FIG. 3 is a schematic sectional view of the electrophotographic image forming apparatus according to this embodiment. A photosensitive drum 101 serving as an image-bearing member is rotationally driven in a counterclockwise direction indicated by the arrow at a predetermined process speed (peripheral speed). The photosensitive drum 101 is subjected to charging treatment to predetermined polarity by a charging device 102 such as a charging roller in the process of the rotation. Next, the charging-treated surface is subjected to exposure treatment by laser light 103 output from a laser optical system 110 based on input image information. The laser optical system 110 outputs the laser light 103, which has been modulated (turned on or off) in correspondence with the time-series electric digital pixel signal of target image information from an image signal generator such as an image-reading device (not shown), to scan and expose the surface of the photosensitive drum 101. As a result, an electrostatic latent image corresponding to the image information is formed on the surface of the photosensitive drum 101 by the scanning exposure. A mirror 109 deflects the laser light 103 output from the laser optical system 110 toward the exposure position of the photosensitive drum 101. Then, the electrostatic latent image formed on the photosensitive drum 101 is visualized with yellow toner by a yellow developing unit 104Y out of a developing device 104. The yellow toner image is transferred onto the surface of an intermediate transfer drum 105 in a primary transfer portion T1 that is a portion of contact between the photosensitive drum 101 and the intermediate transfer drum 105. The toner remaining on the surface of the photosensitive drum 101 is cleaned off by a cleaner 107. Such process cycle of the charging, the exposure, the development, the primary transfer, and the cleaning as described above is similarly repeated with a view to forming a magenta toner image (a developing unit 104M operates), a cyan toner image (a developing unit 104C operates), and a black toner image (a developing unit 104K operates). The toner images of the respective colors sequentially superimposed and formed on the intermediate transfer drum 105 as described above are secondarily transferred onto the recording material P in a collective manner in a secondary transfer portion T2 that is a portion of contact between the drum and a transfer roller 106. The toner remaining on the intermediate transfer drum 105 is cleaned off by a toner cleaner 108. The toner cleaner 108 is made separable from the intermediate transfer drum 105, and is configured to be brought into a state of being in contact with the intermediate transfer drum 105 only when the intermediate transfer drum 105 is cleaned. In addition, the transfer roller 106 is also made separable from the intermediate transfer drum 105, and is configured to be brought into a state of being in contact with the intermediate transfer drum 105 only at the time of the secondary transfer. The recording material P that has passed through the secondary transfer portion T2 is introduced into the fixing device 100 serving as an image-heating device, and is subjected to treatment in which the unfixed toner images carried thereon are fixed (image-heating treatment). Then, the recording material P subjected to the fixing treatment is discharged to the outside of the electrophotographic image forming apparatus. Thus, a series of image-forming operations is completed.

According to one aspect of the present disclosure, the electrophotographic belt of an endless shape, which has a high thermal conductivity in its thickness direction, and has a high tensile strength in each of its peripheral direction and the direction perpendicular to the peripheral direction can be provided. In addition, according to one aspect of the present disclosure, the fixing device and the electrophotographic image forming apparatus that are each capable of forming a high-quality electrophotographic image can be provided. Further, according to one aspect of the present disclosure, the varnish that can provide a polyimide film of an endless shape, the film having a high thermal conductivity in its thickness direction, and showing a high tensile strength in each of its peripheral direction and the direction perpendicular to the peripheral direction, can be provided.

EXAMPLES

The present disclosure is more specifically described below by way of Examples and Comparative Examples, but the present disclosure is not limited by these examples.

First, methods of evaluating physical properties are described.

[Thermal Conductivity]

In the measurement of the thermal conductivity of a polyimide substrate in its thickness direction, the thermal diffusivity thereof at 25° C. was measured with a periodic heating method (temperature wave analysis method)-thermal diffusivity-measuring device (product name: FTC-1, manufactured by Advance Riko, Inc.). Herein, the thermal conductivity was calculated by multiplying the resultant thermal diffusivity, and the density and specific heat of the substrate that had been separately measured.

[Tensile Strength]

The tensile strength of the polyimide substrate in each of its peripheral direction and the direction perpendicular to the peripheral direction was measured based on Japanese Industrial Standard (JIS)-K-7161:2014 with a precision universal tester (product name: AUTOGRAPH AG-X, manufactured by Shimadzu Corporation) at a tensile rate of 5 mm/min, a chuck-to-chuck distance of 40 mm, and 23° C.

[g/d Ratio]

In the Raman spectrum of carbon nanotubes, the ratio g/d of the peak height (intensity) "g" of a band (G band) at 1,590 $cm^{-1}$ resulting from a graphite structure to the peak height (intensity) "d" of a band (D band) at 1,350 $cm^{-1}$ resulting from the defects of the graphite structure was calculated. A 3D laser Raman microspectroscopy system (product name: Nanofinder 30, manufactured by Tokyo Instruments, Inc.) was used in Raman spectroscopy, and the Raman scattering spectrum of the carbon nanotubes was obtained under the following conditions: an excitation laser light source wavelength was 532 nm, a wavenumber fell within the range of from 900 to 2,000, a diffraction grating had a grating constant of 1,200 lines/mm, and an exposure time was 30 seconds.

[Reflection X-Ray Diffraction Method]

The alignment properties of the carbon nanotubes in the polyimide substrate were evaluated by measuring an X-ray diffraction pattern from the sample by a reflection method and its diffraction intensity with an X-ray diffractometer (product name: MiniFlex 600, manufactured by Rigaku Corporation). The measurement conditions of the X-ray diffraction were set as described below.

Tube voltage/current output: 40 kV/15 mA
X-ray source: CuKα (0.154184 nm)
Kβ filter: Ni filter
Scan axis: θ/2θ interlocking
2θ scan range: From 3° to 60°
θ/2θ axis step angle: 0.005° (2θ)

Figure 4:
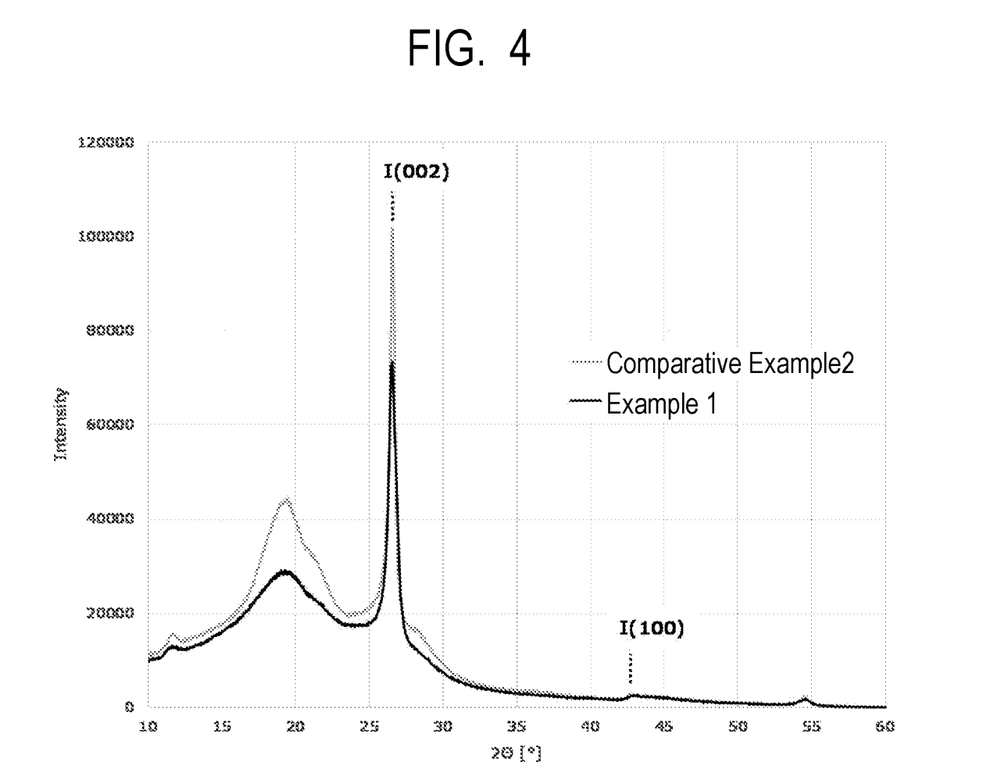
FIG. 4 is an X-ray diffraction pattern of a substrate according to an example of Examples of the present disclosure.

FIG. 4 is an example of the X-ray diffraction pattern obtained by the above-mentioned measurement. The maximum intensity of a diffraction peak derived from the (002) crystal plane of each of the carbon nanotubes, the peak appearing at a 2θ of from 25° to 30°, was represented by I(002), and the maximum intensity of a diffraction peak derived from the (100) crystal plane of each of the carbon nanotubes, the peak appearing at a 2θ of from 40° to 45°, was represented by I(100). A ratio I(002)/I(100) between the intensities was used as an indicator of the alignment properties of the carbon nanotubes in the polyimide substrate. To eliminate the influence of a baseline, a value obtained by subtracting an X-ray diffraction intensity at a 2θ of from 59° to 60° serving as a reference from the measured value was used as each of the I(002) and the I(100).

Next, Examples and Comparative Examples are specifically described.

Example 1

Equimolar amounts of 3,3',4,4'-biphenyltetracarboxylic dianhydride and p-phenylenediamine were caused to react with each other in N-methyl-2-pyrrolidone (NMP, surface tension: 33.8 mN/m) to prepare a solution of a polyimide precursor (polyamic acid) in NMP having a solid content concentration of 18 mass % and a viscosity of 6 Pa·s (hereinafter also referred to as "polyimide precursor solution"). Carbon nanotubes (product name: VGCF-H; manufactured by Showa Denko K.K., average fiber diameter=150 nm, average fiber length=8 μm, g/d=10 to 18) were added to the resultant polyimide precursor solution so that their solid content volume ratio became 15 vol %. Further, 2,4-dimethyl-3-pentanone (surface tension: 22.9 mN/m) was added as an organic compound so that its concentration became 3 mass % with respect to the polyimide precursor solution.

Then, the materials were dispersed with a planetary mixer for 60 minutes to provide a varnish according to this Example.

The resultant varnish was applied to the surface of a cylindrical core body made of aluminum having an outer diameter of 70 mm and a length of 500 mm by using a ring coating method. The surface of the cylindrical core body was subjected to ceramic coating in advance so that a belt was easily removed from the core body after its molding.

As a drying step, while the cylindrical core body was rotated at a rotational speed of 60 rpm, its outer surface was heated with a near-infrared heater for 30 minutes with the temperature of the outer surface kept at 120° C. Further, the surface was heated at a temperature of 150° C. for 20 minutes and at a temperature of 200° C. for 30 minutes so that NMP was volatilized in a substantially complete manner. Thus, the coating film of the varnish was solidified.

Subsequently, as a step of imidizing the polyimide precursor in the coating film, the core body was left at rest in a hot air-circulating furnace, and was heated at a temperature of 250° C. for 30 minutes and subsequently at a temperature of 350° C. for 30 minutes so that the imidization reaction was advanced. Thus, a polyimide film that was a cured product was formed. Next, after having been cooled to a temperature of 25° C., the polyimide film was removed from the cylindrical core body to provide a substrate of an endless shape having a thickness of 80 μm.

The tensile strength of the resultant substrate, the thermal conductivity thereof in its thickness direction, and the X-ray diffraction peak intensity ratio thereof were measured in accordance with the above-mentioned methods. As a result, as shown in Table 2, the tensile strength was 209 MPa, the thermal conductivity in the thickness direction was 1.64 W/(m·K), and the X-ray diffraction peak intensity ratio was 22.3.

Further, a comprehensive rank evaluation was performed based on the following criteria.
(Evaluation)
Rank A: The substrate satisfied all of the following items: a mechanical strength (tensile strength) of 200 MPa or more and a thermal conductivity of 1.0 W/(m·K) or more.
Rank B: The substrate satisfied all of the following items: a mechanical strength (tensile strength) of 200 MPa or more and a thermal conductivity of 0.9 W/(m·K) or more.
Rank C: The substrate failed to satisfy any one of the items.

Examples 2 to 11

Varnishes according to the respective Examples were each prepared in the same manner as in the varnish according to Example 1 except that at least one of the addition amount of the CNTs, the kind of the organic compound, or the addition amount of the organic compound was changed as shown in Table 1. Then, substrates were each produced in the same manner as in Example 1 except that: the varnishes according to the respective Examples were each used; and the thickness of the polyimide film after the baking was set to a thickness shown in Table 2, followed by the evaluations of the substrates. The evaluation results are shown in Table 2.

Examples 12 to 14

Varnishes according to the respective Examples were each prepared in the same manner as in the varnish according to Example 1 except that the kind of the organic compound and the addition amount thereof were changed as shown in Table 1. Then, substrates were each produced in the same manner as in Example 1 except that: the varnishes according to the respective Examples were each used; and the thickness of the polyimide film after the baking was set to a thickness shown in Table 2, followed by the evaluations of the substrates. The evaluation results are shown in Table 2.

Comparative Examples 1 and 2

Varnishes according to Comparative Example 1 and Comparative Example 2 were each prepared in the same manner as in the varnish according to Example 1 except that: no organic compound was added; and the addition amount of the CNTs was changed as shown in Table 1. Then, substrates were each produced in the same manner as in Example 1 except that: the varnish according to Comparative Example 1 or Comparative Example 2 was used; and the thickness of the polyimide film after the baking was set to a thickness shown in Table 2, followed by the evaluations of the substrates. The evaluation results are shown in Table 2.

In Comparative Example 1 in which the CNTs were added at a solid content volume ratio of 16 vol %, the thermal conductivity was more than 0.9 W/(m·K). However, the tensile strength was less than 200 MPa owing to the large content of the CNTs in the substrate. In Comparative Example 2, the addition amount of the CNTs was set to 13 vol %, and hence the tensile strength was more than 200 MPa. However, the CNTs were aligned in the in-plane direction of the substrate, and hence the thermal conductivity of the substrate in the thickness direction was less than 0.9 W/(m·K).

Comparative Examples 3 to 5

The organic compound in the varnish according to Example 1 was changed to a compound shown in Table 1, and the addition amount of the compound was changed as shown in Table 1. Varnishes according to Comparative Examples 3 to 5 were each prepared in the same manner as in the varnish according to Example 1 except the foregoing. Then, substrates were each produced in the same manner as in Example 1 except that: the varnish according to Comparative Example 3, 4, or 5 was used; and the thickness of the polyimide film after the baking was set to a thickness shown in Table 2, followed by the evaluations of the substrates. The evaluation results are shown in Table 2.

As shown in Table 2, the substrates according to Comparative Examples 3 to 5 each had a thermal conductivity of less than 0.9 W/(m·K). With regard to each of the substrates according to Comparative Examples 3 and 4, the surface tension difference between the compound (glycerin or dicyclopropylketone) in the varnish and NMP that was a solvent was more than 17 mN/m, and hence compatibility therebetween was poor. Accordingly, it is conceivable that in the process of the evaporation of the solvent at the time of the curing of the coating film of the varnish by its heating, convection was hardly caused in the coating film by a microscopic surface tension difference. It is assumed that as a result of the foregoing, the effect by which the orientation of the CNTs that were liable to be aligned in the in-plane direction of the coating film was disturbed in the thickness direction of the coating film was hardly obtained. In addition, with regard to the substrate according to Comparative Example 5, at the time of the curing of the coating film of the varnish, convection was hardly caused in the coating film by a microscopic surface tension difference probably because the surface tension difference between the compound (butyl cellosolve) and NMP was less than 4 mN/m. It is assumed that as a result of the foregoing, the effect by which the alignment direction of the CNTs aligned in the in-plane direction of the coating film was disturbed in the thickness direction of the coating film was hardly obtained.

Comparative Example 6

In the varnish according to Example 1, no organic compound was added, and polyimide resin particles (product name: P84NT; manufactured by Daicel-Evonik Ltd., particle diameter: from 1 μm to 10 μm) were added in an amount shown in Table 1 in terms of solid content volume ratio. A varnish according to Comparative Example 6 was prepared in the same manner as in the varnish according to Example 1 except the foregoing. Then, a substrate was produced in the same manner as in Example 1 except that: the varnish according to this Comparative Example was used; and the thickness of the polyimide film after the baking was set to a thickness shown in Table 2, followed by the evaluation of the substrate. The evaluation results are shown in Table 2. As shown in Table 2, the substrate according to this Comparative Example had a thermal conductivity of more than 0.9 W/(m·K) in its thickness direction. This is probably because the polyimide resin particles inhibited the alignment of the CNTs in the plane of the film, and as a result, the CNTs were aligned in the thickness direction to some extent. Meanwhile, the tensile strength was less than 200 MPa. Such reduction in tensile strength may be due to the fact that the total amount of the thermally conductive fillers (the CNTs and the polyimide resin particles) in the substrate was as large as 25 vol % (15 vol %+10 vol %).

Comparative Example 7

In the varnish according to Example 1, no organic compound was added, and boron nitride (product name: MBN-010T; manufactured by Mitsui Chemicals, Inc., average particle diameter: 0.9 μm) was added in an amount shown in Table 1 in terms of solid content volume ratio. A varnish according to Comparative Example 7 was prepared in the same manner as in the varnish according to Example 1 except the foregoing. Then, a substrate was produced in the same manner as in Example 1 except that: the varnish according to this Comparative Example was used; and the thickness of the polyimide film after the baking was set to a thickness shown in Table 2, followed by the evaluation of the substrate. The evaluation results are shown in Table 2. As shown in Table 2, the thermal conductivity of the substrate according to this Comparative Example in its thickness direction was much more than 0.9 W/(m·K), but the tensile strength thereof was less than 200 MPa. Such reduction in tensile strength may be due to the fact that the total amount of the thermally conductive fillers (the CNTs and boron nitride) in the substrate was as large as 30 vol % (15 vol %+15 vol %).

Comparative Example 8

In the varnish according to Example 1, no organic compound was added, and the CNTs were changed from the "VGCF-H" to "TNIM-8" (product name, manufactured by Timesnano, average fiber diameter=30 nm to 80 nm, average fiber length=10 μm or less, g/d=1.6 to 2.2). In addition, the solid content volume ratio of the CNTs was set to an amount shown in Table 1. A varnish according to Comparative Example 8 was prepared in the same manner as in the varnish according to Example 1 except the foregoing. Then, a substrate was produced in the same manner as in Example 1 except that: the varnish according to this Comparative Example was used; and the thickness of the polyimide film after the baking was set to a thickness shown in Table 2, followed by the evaluation of the substrate. The evaluation results are shown in Table 2. As shown in Table 2, the tensile strength was more than 200 MPa, but the thermal conductivity in the thickness direction was much less than 0.9 W/(m·K).

Comparative Example 9

In the varnish according to Example 1, no organic compound was added, and the CNTs were changed from the "VGCF-H" to "Multi-wall L-MWNT-1020" (product name, manufactured by NTP, average fiber diameter=10 nm to 20 nm, average fiber length=5 μm or more, g/d=1.4 to 2.4). In addition, the solid content volume ratio of the CNTs was set to an amount shown in Table 1. A varnish according to Comparative Example 9 was prepared in the same manner as in the varnish according to Example 1 except the foregoing. Then, a substrate was produced in the same manner as in Example 1 except that: the varnish according to this Comparative Example was used; and the thickness of the polyimide film after the baking was set to a thickness shown in Table 2, followed by the evaluation of the substrate. The evaluation results are shown in Table 2. As shown in Table 2, the tensile strength was more than 200 MPa, but the thermal conductivity in the thickness direction was much less than 0.9 W/(m·K).

TABLE 1

| | | Kind of CNTs (product name) | g/d ratio | Blending amount (vol %) | Added compound | Surface tension difference (mN/m) | Addition amount (mass %) | Other additive | Blending amount (vol %) |
|---|---|---|---|---|---|---|---|---|---|
| Example | 1 | VGCF-H | 10 to 18 | 15 | 2,4-Dimethyl-3-pentanone | 10.9 | 3 | — | 0 |
| | 2 | VGCF-H | 10 to 18 | 10 | 2,4-Dimethyl-3-pentanone | 10.9 | 4 | — | 0 |
| | 3 | VGCF-H | 10 to 18 | 12.5 | 2-Methylsulfonylethanol (2-hydroxyethylmethylsulfone) | 12.1 | 2 | — | 0 |
| | 4 | VGCF-H | 10 to 18 | 10 | Octamethylcyclotetrasiloxane | 15.4 | 4 | — | 0 |
| | 5 | VGCF-H | 10 to 18 | 15 | Ethylene glycol | 9.6 | 2 | — | 0 |
| | 6 | VGCF-H | 10 to 18 | 15 | 5-(2-Hydroxyethyl)-4-methylthiazole | 16.1 | 2 | — | 0 |
| | 7 | VGCF-H | 10 to 18 | 14 | 3-Methoxy-3-methyl-butanol | 5.8 | 2 | — | 0 |
| | 8 | VGCF-H | 10 to 18 | 14 | Diisobutylamine | 10.7 | 4 | — | 0 |
| | 9 | VGCF-H | 10 to 18 | 14 | 3'-Nitroacetophenone | 13.3 | 4 | — | 0 |
| | 10 | VGCF-H | 10 to 18 | 13 | Furfuryl alcohol | 5.0 | 2 | — | 0 |

TABLE 1-continued

|  |  | Kind of CNTs (product name) | g/d ratio | Blending amount (vol %) | Added compound | Surface tension difference (mN/m) | Addition amount (mass %) | Other additive | Blending amount (vol %) |
|---|---|---|---|---|---|---|---|---|---|
|  | 11 | VGCF-H | 10 to 18 | 13 | o-Chlorophenol | 10.9 | 2 | — | 0 |
|  | 12 | VGCF-H | 10 to 18 | 15 | 2,4-Dimethyl-3-pentanone | 10.9 | 1 | — | 0 |
|  |  |  |  |  | 3-Methoxy-3-methyl-butanol | 5.8 | 1 |  |  |
|  | 13 | VGCF-H | 10 to 18 | 15 | Furfuryl alcohol | 5.0 | 1 | — | 0 |
|  |  |  |  |  | 5-(2-Hydroxyethyl)-4-methylthiazole | 16.1 | 1 |  |  |
|  | 14 | VGCF-H | 10 to 18 | 15 | Ethylene glycol | 9.6 | 1 | — | 0 |
|  |  |  |  |  | 5-(2-Hydroxyethyl)-4-methylthiazole | 16.1 | 1 |  |  |
| Comparative Example | 1 | VGCF-H | 10 to 18 | 16 | — | 0.0 | 0.0 | — | 0 |
|  | 2 | VGCF-H | 10 to 18 | 13 | — | 0.0 | 0.0 | — | 0 |
|  | 3 | VGCF-H | 10 to 18 | 15 | Glycerin | 22.7 | 2 | — | 0 |
|  | 4 | VGCF-H | 10 to 18 | 15 | Dicyclopropylketone | 18.6 | 2 | — | 0 |
|  | 5 | VGCF-H | 10 to 18 | 15 | Butyl cellosolve | 3.9 | 4 | — | 0 |
|  | 6 | VGCF-H | 10 to 18 | 15 | — | 0.0 | 0.0 | P84NT | 10 |
|  | 7 | VGCF-H | 10 to 18 | 15 | — | 0.0 | 0.0 | MBN-010T | 15 |
|  | 8 | TNIM-8 | 1.6 to 2.2 | 10.5 | — | 0.0 | 0.0 | — | 0 |
|  | 9 | L-MWNT-1020 | 1.4 to 2.4 | 10.5 | — | 0.0 | 0.0 | — | 0 |

TABLE 2

|  | Thickness (μm) | I(002)/I(100) | Tensile strength (MPa) | Thermal conductivity (W/m · K) | Judgment |
|---|---|---|---|---|---|
| Example 1 | 81 | 22.3 | 209 | 1.64 | A |
| Example 2 | 122 | 28.2 | 235 | 1.01 | A |
| Example 3 | 84 | 30.1 | 210 | 1.12 | A |
| Example 4 | 77 | 32.5 | 242 | 0.92 | B |
| Example 5 | 72 | 33.9 | 205 | 1.18 | A |
| Example 6 | 65 | 34.3 | 204 | 1.10 | A |
| Example 7 | 38 | 33.2 | 208 | 0.92 | B |
| Example 8 | 75 | 33.0 | 210 | 0.96 | B |
| Example 9 | 83 | 33.3 | 206 | 0.97 | B |
| Example 10 | 91 | 32.2 | 209 | 0.93 | B |
| Example 11 | 153 | 31.5 | 203 | 0.98 | B |
| Example 12 | 60 | 28.0 | 208 | 1.30 | A |
| Example 13 | 79 | 32.3 | 207 | 1.00 | A |
| Example 14 | 69 | 34.4 | 205 | 1.10 | A |
| Comparative Example 1 | 80 | 36.2 | 192 | 0.94 | C |
| Comparative Example 2 | 76 | 36.2 | 224 | 0.69 | C |
| Comparative Example 3 | 88 | 35.9 | 201 | 0.87 | C |
| Comparative Example 4 | 82 | 35.2 | 204 | 0.88 | C |
| Comparative Example 5 | 35 | 36.7 | 203 | 0.80 | C |
| Comparative Example 6 | 92 | 34.9 | 175 | 0.99 | C |
| Comparative Example 7 | 89 | 31.8 | 98 | 2.55 | C |
| Comparative Example 8 | 83 | 13.5 | 222 | 0.30 | C |
| Comparative Example 9 | 81 | 10.7 | 243 | 0.32 | C |

[Evaluation as Fixing Belt]

A fixing belt was produced by: forming an elastic layer formed of a silicone rubber on the outer peripheral surface of each of the substrates according to Examples 1 to 14; and forming a release layer formed of a fluorine resin on the outer peripheral surface of the layer. Each of those fixing belts was mounted on the fixing device according to FIG. 2, and the fixing device was incorporated into the electrophotographic image forming apparatus according to FIG. 3. Then, 600,000 electrophotographic images were formed with the electrophotographic image forming apparatus. As a result, a high-quality electrophotographic image was able to be stably formed. In addition, in the process of the formation of the 600,000 electrophotographic images, no crack occurred in the substrate of the fixing belt.

A fixing belt was produced in the same manner as that described above except that each of the substrates according to Comparative Examples 1, 6, and 7 was used. Incorporation into the electrophotographic image forming apparatus was performed in the same manner as that described above except that each of those fixing belts was used. Then, 600,000 electrophotographic images were formed with the electrophotographic image forming apparatus. As a result, a crack occurred in the substrate of the fixing belt owing to bending fatigue before the number of formed images reached 600,000.

In addition, a fixing belt was produced in the same manner as that described above except that each of the substrates according to Comparative Examples 2, 3, 4, 5, 8, and 9 was used. Incorporation into the electrophotographic image forming apparatus was performed in the same manner as that described above except that each of those fixing belts was used. Then, 600,000 electrophotographic images were formed with the electrophotographic image forming apparatus. As a result, in the process of the formation of the 600,000 images, no crack occurred in the substrate of each of the fixing belts. However, the thermal conductivity of the substrate in its thickness direction was low, and hence the fixability of each of the electrophotographic images was insufficient.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-099881, filed Jun. 16, 2021, Japanese Patent Application No. 2022-043956, filed Mar. 18, 2022, and Japanese Patent Application No. 2022-080270, filed May 16, 2022, which are hereby incorporated by reference herein in their entirety.

What is claimed is:

1. An electrophotographic belt having an endless shape and comprising a substrate,
the substrate containing a polyimide resin and carbon nanotubes, a content of the carbon nanotubes in the substrate being 15 vol % or less with respect to a total volume of the polyimide resin, the substrate having a tensile strength of 200 MPa or more in each of a peripheral direction thereof and a direction perpendicular to the peripheral direction, and the substrate having a thermal conductivity of 0.9 W/(m·K) or more in a thickness direction thereof, wherein when measuring a surface of the substrate by a reflection X-ray diffraction method, and an intensity of a diffraction peak derived from a (100) crystal plane of each of the carbon nanotubes is represented by I(100) and an intensity of a diffraction peak derived from a (002) crystal plane of each of the carbon nanotubes is represented by I(002), a ratio I(002)/I(100) is 35 or less.

2. The electrophotographic belt according to claim 1, wherein a ratio (g/d) of an intensity "g" of a G band to an intensity "d" of a D band in a Raman spectrum of the carbon nanotubes is 10 or more.

3. The electrophotographic belt according to claim 1, wherein the substrate contains a cured product of a varnish including: a polyamic acid; a solvent for the polyamic acid; the carbon nanotubes; and a compound having a surface tension which differs from that of the solvent by 4 mN/m to 17 mN/m.

4. The electrophotographic belt according to claim 3, wherein the compound is blended at a ratio of 0.1 mass % to 6.0 mass % with respect to a total mass of the varnish.

5. The electrophotographic belt according to claim 3, wherein the solvent for the polyamic acid is at least one organic solvent selected from the group consisting of: N-methyl-2-pyrrolidone; and N,N-dimethylformamide.

6. The electrophotographic belt according to claim 3, wherein the compound is at least one organic compound selected from the group consisting of: ethylene glycol; 3-methoxy-3-methyl-butanol; diisobutylamine; 3'-nitroacetophenone; 5-(2-hydroxyethyl)-4-methylthiazole; furfuryl alcohol; o-chlorophenol; 2-hydroxyethylmethylsulfone; and 2,4-dimethyl-3-pentanone.

7. The electrophotographic belt according to claim 1, wherein the substrate has a thickness of 40 m to 150 m.

8. The electrophotographic belt according to claim 1, further comprising a fluorine resin layer serving as a release layer on an outer peripheral surface of the substrate.

9. The electrophotographic belt according to claim 8, further comprising an elastic layer between the substrate and the release layer.

10. The electrophotographic belt according to claim 1, wherein the electrophotographic belt is a fixing belt.

11. A fixing device comprising:

a fixing belt having an endless shape; and a rotating body for pressurization arranged to face the fixing belt, wherein the fixing belt is an electrophotographic belt of an endless shape including a substrate of an endless shape, wherein the substrate contains a polyimide resin and carbon nanotubes, wherein a content of the carbon nanotubes in the substrate is 15 vol % or less with respect to a total volume of the polyimide resin, wherein the substrate has a tensile strength of 200 MPa or more in each of a peripheral direction thereof and a direction perpendicular to the peripheral direction, and wherein the substrate has a thermal conductivity of 0.9 W/(m·K) or more in a thickness direction thereof, and wherein when measuring a surface of the substrate by a reflection X-ray diffraction method, and an intensity of a diffraction peak derived from a (100) crystal plane of each of the carbon nanotubes is represented by I(100) and an intensity of a diffraction peak derived from a (002) crystal plane of each of the carbon nanotubes is represented by I(002), a ratio I(002)/I(100) is 35 or less.

12. An electrophotographic image forming apparatus comprising the fixing device of claim 11.

* * * * *